US011405487B2

(12) United States Patent
Shani et al.

(10) Patent No.: US 11,405,487 B2
(45) Date of Patent: Aug. 2, 2022

(54) SYSTEM AND METHOD FOR UNIDIRECTIONAL COMMUNICATION MANAGEMENT SYSTEM

(71) Applicant: Vado Security Technologies Ltd., Tel Aviv (IL)

(72) Inventors: Oren Shani, Givataaim (IL); Tamir Levinas, Tel Aviv (IL); Yossi Ben Hagay, Petach Tikva (IL)

(73) Assignee: VADO SECURITY TECHNOLOGIES LTD., Tel Aviv (IL)

( * ) Notice: Subject to any disclaimer, the term of this patent is extended or adjusted under 35 U.S.C. 154(b) by 251 days.

(21) Appl. No.: 16/359,379

(22) Filed: Mar. 20, 2019

(65) Prior Publication Data
US 2020/0304600 A1   Sep. 24, 2020

(51) Int. Cl.
*H04L 67/01*  (2022.01)
*H04L 67/60*  (2022.01)
*H04L 67/02*  (2022.01)

(52) U.S. Cl.
CPC .............. *H04L 67/42* (2013.01); *H04L 67/02* (2013.01); *H04L 67/32* (2013.01)

(58) Field of Classification Search
None
See application file for complete search history.

(56) References Cited

U.S. PATENT DOCUMENTS

| 7,584,262 | B1 * | 9/2009 | Wang | H04L 12/4625 709/217 |
| 8,316,237 | B1 * | 11/2012 | Felsher | H04L 9/0825 713/171 |
| 2012/0036178 | A1 * | 2/2012 | Gavini | H04L 67/2804 709/203 |
| 2014/0136657 | A1 * | 5/2014 | Mraz | H04L 67/00 709/217 |
| 2015/0288671 | A1 * | 10/2015 | Chan | H04L 67/2838 726/1 |

* cited by examiner

*Primary Examiner* — Mohamed Ibrahim
(74) *Attorney, Agent, or Firm* — Browdy and Neimark, P.L.L.C.

(57) ABSTRACT

The present invention provides a system for managing communication requests between client and server over secured communication network unidirectional communication paths, comprising of at least one of the following physical or virtual modules:
  a. a first unidirectional communication path comprised of at least one RX receiver and TX transceiver enabling to transmit request from the client to the server;
  b. a second unidirectional communication path comprised of at least one RX receiver and TX transceiver enabling to transmit response to request from the server to the client;
  c. a client communication management module for managing all incoming requests from the client by indexing said request;
  d. a web communication management module for managing all received replies from the server based on request index.

6 Claims, 4 Drawing Sheets

| Client original request index | Client ID | Time stamp | Destination ID |
|---|---|---|---|
| | | | |
| | | | |
| | | | |
| | | | |
| | | | |

Fig. 4

SYSTEM AND METHOD FOR UNIDIRECTIONAL COMMUNICATION MANAGEMENT SYSTEM

FIELD OF THE INVENTION

The presented invention generally relates to the field of computer networks, and specifically relates to communication over unidirectional medium.

DISCUSSION OF RELATED ART

The use of unidirectional network elements is commonplace in modern network security disciplines. They are often located in the junction points between networks of different security levels. Such devices enable the transfer of data in one direction only, as their name implies, and therefore provide inherent security, as data is simply unreachable from beyond the protected network.

The introduction of unidirectional network elements does however take a toll on the network's flexibility. Creative solutions are required in order to maintain the network's plasticity, and the streamlined connectivity among its member nodes.

SUMMARY OF THE INVENTION

The present invention provides a system for managing communication requests between client and server over secured communication network unidirectional communication paths, said system comprising a non-transitory storage device and one or more processing devices operatively coupled to the storage device on which are stored modules of instruction code executable by the one or more processors:
  a. a first unidirectional communication path comprised of at least one RX receiver and TX transceiver enabling to transmit request from the client to the server;
  b. a second unidirectional communication path comprised of at least one RX receiver and TX transceiver enabling to transmit response to request from the server to the client;
  c. a client communication management module for managing all incoming requests from the client by indexing said request;
  d. a web communication management module for managing all received replies from the server based on request index.

According to some embodiments of the present invention said indexing include identifying said request by the requesting user ID, target server ID and time stamp.

According to some embodiments of the present invention the client communication management module implements the following steps:
receive users request and indexing the request, client creating index parameter saving said index parameter in indexing table;
receiving response from web server through one-way communication TX/RX transceiver via router,
checking response index of the receptive HTTP request.by identifying original user request by index.
converting the one-way response format into HTTP Response to be sent to the client
sending formatted HTTP response to the client through the Return unidirectional communication path.

According to some embodiments of the present invention the web communication management module implements the following steps:
receive users request index by client and time from one way one communication link of TX/RX transceivers through router,
convert one way request format to create HTTP request sent to the designated web server
receiving response from web server,
checking index by identifying user original request index;
formatting Response from HTTP format to one way transmission format
sending formatted response to be sent client through one-way communication Tx/tr transceiver to be sent the client;

The present invention provides a method for managing communication requests between client and server over secured communication network unidirectional communication paths, said method implemented by one or more processing devices operatively coupled to a non-transitory storage device, on which are stored modules of instruction code that when executed cause the one or more processing devices to perform:
  e. transmit request form the client to the server by a forward unidirectional communication path comprised of at least one RX receiver and TX transceiver;
  f. transmitting response to request from the server to the client by a return unidirectional communication path comprised of at least one RX receiver and TX transceiver enabling to;
  g. managing all incoming requests from the client and all received replies from the server by indexing said request using a client communication management module, wherein said indexing include identifying said request by the requesting user ID and target server ID and time stamp;
  h. managing all incoming requests from the client and all received replies from the server by a web communication management module based on requests indexing;

According to some embodiments of the present invention said indexing include identifying said request by the requesting user ID, target server ID and time stamp.

According to some embodiments of the present invention the client communication management module implements the following steps:
receive users request and indexing the request, client creating index parameter saving said index parameter in indexing table;
receiving response from web server through one-way communication TX/RX transceiver via router,
checking response index of the receptive HTTP request.by identifying original user request by index.
converting the one-way response format into HTTP Response to be sent to the client
sending formatted HTTP response to the client through the Return unidirectional communication path.

According to some embodiments of the present invention the web communication management module implements the following steps:
receive users request index by client and time from one way one communication link of TX/RX transceivers through router,
convert one way request format to create HTTP request sent to the designated web server
receiving response from web server, checking index by identifying user original request index;
formatting Response from HTTP format to one way transmission format
sending formatted response to be sent client through one-way communication Tx/tr transceiver to be sent the client;

DESCRIPTION OF THE DRAWINGS

FIG. 4 is an example of a communication request index table according system according to one embodiment of the present invention.

DETAILED DESCRIPTION OF SOME EMBODIMENTS OF THE INVENTION

Figure 1:
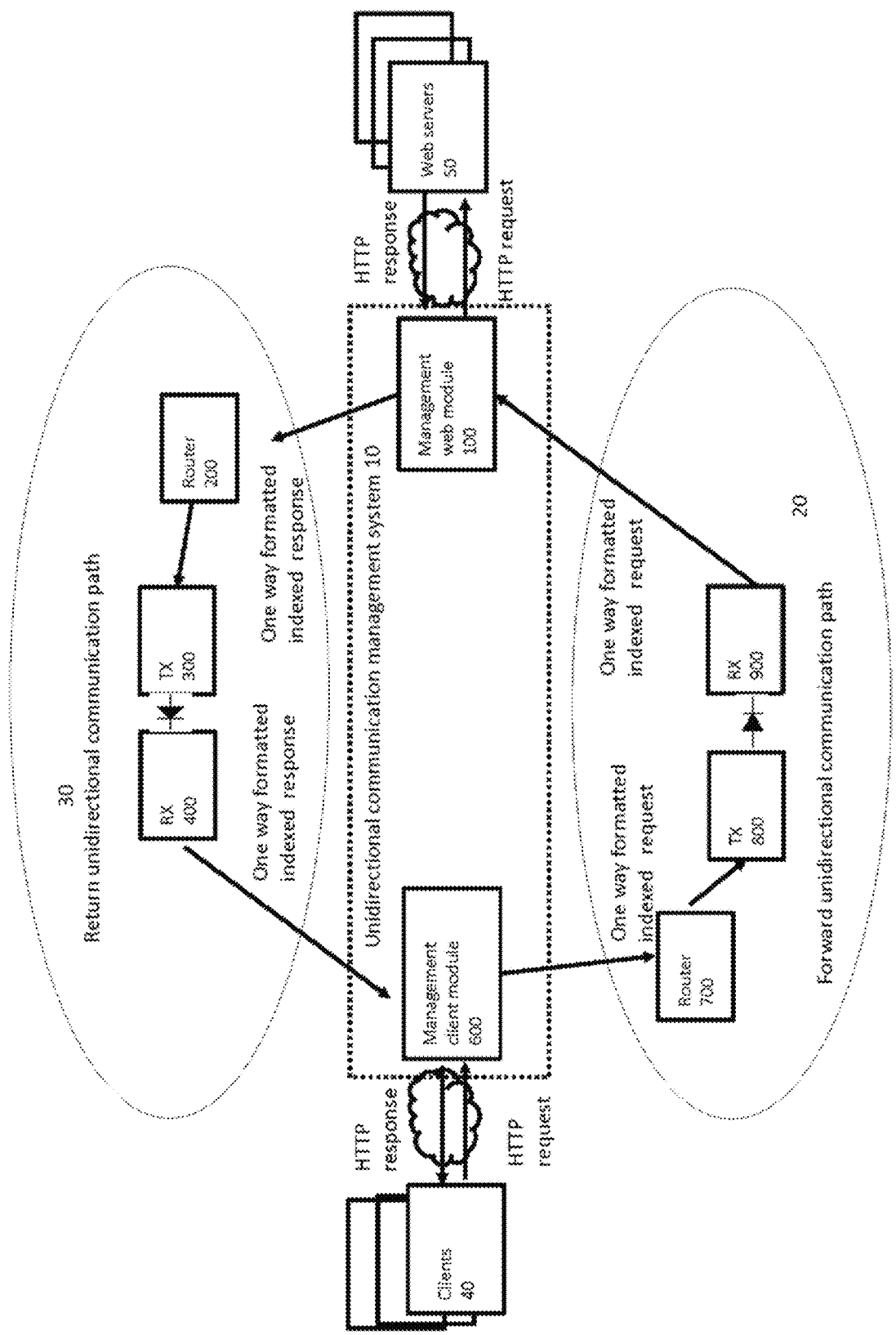
FIG. 1 presents the communication requests managing system according to one embodiment of the present invention.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The Unidirectional communication management system 10 serves for managing communication request between client and severs FIG. 1 presents the communication requests managing system and environment according to one embodiment of the present invention. The Unidirectional communication management system 10 serves for managing communication request between client 40 and web servers 50, through Forward unidirectional communication path 30 and Return unidirectional communication path 30.

The unidirectional communication management system 10, is comprised of:
client management module 600 for managing the incoming communication requests from the user (e.g. HTTP requests) 10 and the return replies received from the web server, the request is identified based on created index associated by client, web destination and time stamp;
management web module 100 for managing the communication requests from the client management module 600 and the return to the client management module 600 replies coming from the web servers.

The forward unidirectional communication path 30 is conveying communication request from the client 40 to server 50, using unidirectional TX 800 and RX 900 units and routers 700 and 950

The return unidirectional communication path 20 is conveying communication replies from the server 50 to the client 40, using unidirectional TX 300 and RX 400 units and routers 200 and 500.

Figure 2:
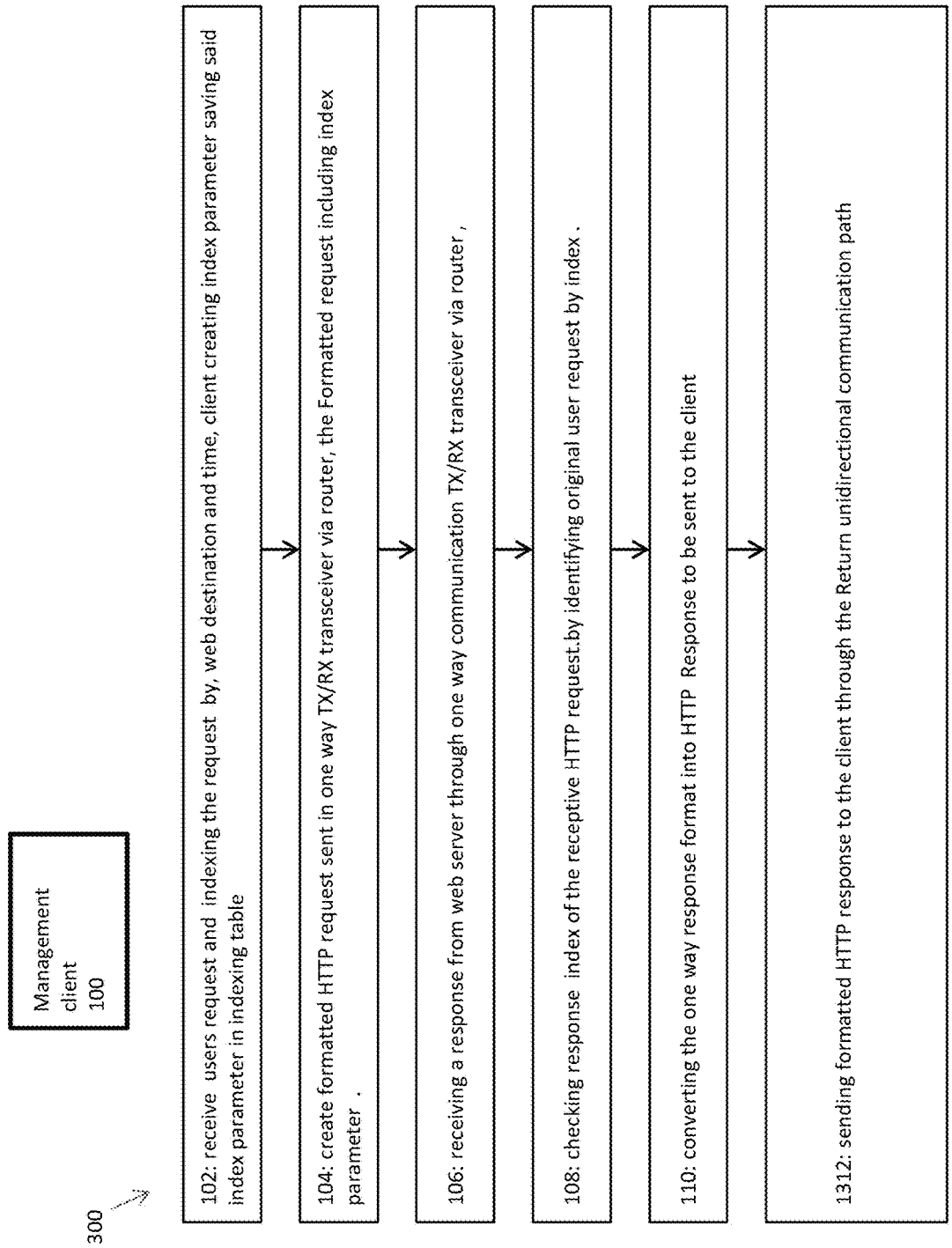
FIG. 2 is a flow diagram, of the depicting the process of Management client module according system according to one embodiment of the present invention.

FIG. 2 is a flow diagram, of the depicting the process of Management client module according system according to one embodiment of the present invention.

The Management client module, perform the flowing steps:
receive users requests and indexing the request by, web destination and time, client ID, creating index parameter saving said index parameter in indexing table;
receiving response from web server through one-way communication TX/RX transceiver via router,
checking response index of the receptive HTTP request.by identifying original user request by index.
converting the one-way response format into HTTP Response to be sent to the client
sending formatted HTTP response to the client through the Return unidirectional communication path.

Figure 3:
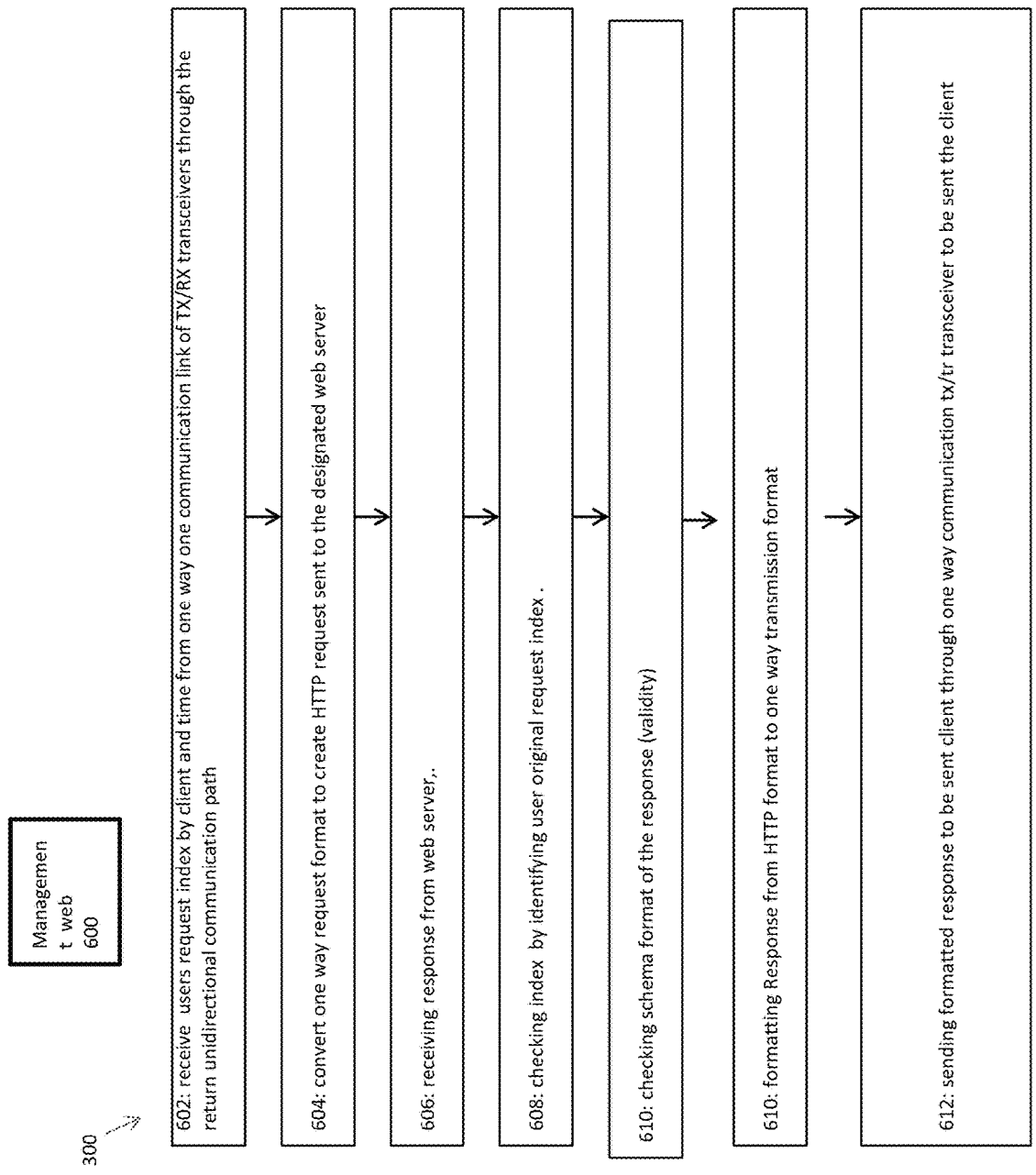
FIG. 3 is a flow diagram, of the depicting the process of Management web module according system according to one embodiment of the present invention.

FIG. 3 is a flow diagram, of the depicting the process of Management web module according system according to one embodiment of the present invention.

The Management client module, perform the at least on one of the flowing steps:
receive users request index by client and time from one way one communication link of TX/RX transceivers through router,
convert one-way request format to create HTTP request sent to the designated web server;
receiving response from web server;
checking index by identifying user original request index;
checking schema format of the response (validity)
formatting Response from HTTP format to one-way transmission format
sending formatted response to be sent client through one-way communication Tx/tr transceiver to be sent the client FIG. 4 is an example of a communication request index table according system according to one embodiment of the present invention.

The index table according to some embodiments, include index of client, client ID, time stamp, destination ID. The index table may be saved in the cloud, accessible to the client management module and web management module.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMS. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program such as but not limited to a general-purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMS. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A system for managing communication requests between client and server over secured communication network unidirectional communication paths, said system comprising a non-transitory storage device and one or more processing devices operatively coupled to the storage device on which are stored modules of instruction code executable by the one or more processors:
   a. a first unidirectional communication path comprised of at least one first private router, and a unidirectional first receiver (RX) unit and first transmitter (TX) unit enabling to transmit request from the client to the server;
   b. a second unidirectional communication path comprised of at least one at least one second private router, and a unidirectional second receiver (RX) unit and second transmitter (TX) unit enabling to transmit response to request from the server to the client;
   c. a client communication management module for managing all incoming requests from the client by indexing said requests;
   d. a web communication management module for managing all received replies from the server based on said indexing of said requests;

wherein the client communication management module and the web communication management module communicate through a public data communication network;

wherein the first and the second unidirectional communication paths are implemented on different computing platforms, wherein said computing platforms are implemented at separated communications paths;

wherein communication separation is implemented by at least the first and the second private router, wherein the first private router connects the client communication management module communicating through private data communication network with the first unidirectional RX and Tx units; and the second private router connects the web communication management module communicating through private data communication network to the second unidirectional RX and Tx units;

wherein said indexing includes identifying each of said requests by requesting user identification (ID), target server identification (ID) and time stamp.

2. The system of claim 1 wherein the client communication management module implements the following steps:

receiving users request and indexing the request, client creating index parameter saving said index parameter in indexing table;

receiving response from web server through one-way communication transceiver (TX/RX) via router, checking response index of the receptive hypertext transfer protocol (HTTP) request.by identifying original user request by index;

converting the one-way response format into hypertext transfer protocol (HTTP) response to be sent to the client;

sending formatted hypertext transfer protocol (HTTP) response to the client through the return unidirectional communication path.

3. The system of claim 1 wherein the web communication management module implements the following steps:

receiving users request index by client and time from one way one communication link of transceivers (TX/RX) through router, converting one way request format to create hypertext transfer protocol (HTTP) request sent to the designated web server, receiving response from web server, checking index by identifying user original request index, formatting response from hypertext transfer protocol (HTTP) format to one way transmission format, sending formatted response to be sent client through one-way communication transceiver (TX/RX) to be sent the client.

4. A method for managing communication requests between client and server over secured communication network unidirectional communication paths, said method implemented by one or more processing devices operatively coupled to a non-transitory storage device, on which are stored modules of instruction code that when executed cause the one or more processing devices to perform:

a. transmitting request from the client to the server by a forward unidirectional communication path comprised of at least one first private router, and a unidirectional first receiver (RX) unit and first transmitter (TX) unit;

b. transmitting response to request from the server to the client by a return unidirectional communication path comprised of at least one second private router, and a unidirectional second receiver (RX) unit and second transmitter (TX) unit;

c. managing all incoming requests from the client and all received replies from the server by indexing said requests using a client communication management module, wherein said indexing include identifying said requests by requesting user identification (ID) and target server identification (ID) and time stamp;

d. managing all incoming requests from the client and all received replies from the server by a web communication management module based on said indexing of said requests wherein the first and the second unidirectional communication paths are implemented on different computing platforms, wherein said computing platforms are implemented at separated communications paths;

wherein the client communication management module and the web communication management module communicate through a public data communication network;

wherein communication separation is implemented by at least the first and the second private router, wherein the first private router connects the client communication management module communicating through private data communication network with the first unidirectional RX and Tx units; and the second private router connects the web communication management module communicating through private data communication network to the second unidirectional RX and Tx units.

5. The method of claim 4 wherein the client communication management module implements the following steps:

receiving users request and indexing the request, client creating index parameter saving said index parameter in indexing table;

receiving response from web server through one-way communication transceiver (TX/RX) via router;

checking response index of the receptive hypertext transfer protocol (HTTP) request.by identifying original user request by index;

converting the one-way response format into hypertext transfer protocol (HTTP) response to be sent to the client;

sending formatted hypertext transfer protocol (HTTP) response to the client through the return unidirectional communication path.

6. The method of claim 4 wherein the web communication management module implements the following steps:

receiving users request index by client and time from one way one communication link of transceivers (TX/RX) through router, converting one way request format to create hypertext transfer protocol (HTTP) request sent to the designated web server receiving response from web server, checking index by identifying user original request index, formatting response from hypertext transfer protocol (HTTP) format to one way transmission format, sending formatted response to be sent client through one-way communication transceiver (TX/RX) to be sent the client.

* * * * *